US010063445B1

(12) United States Patent
Preece

(10) Patent No.: US 10,063,445 B1
(45) Date of Patent: Aug. 28, 2018

(54) DETECTING MISCONFIGURATION DURING SOFTWARE DEPLOYMENT

(71) Applicant: Amazon Technologies, Inc., Reno, NV (US)

(72) Inventor: Eric Scott Preece, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 24 days.

(21) Appl. No.: 14/311,085

(22) Filed: Jun. 20, 2014

(51) Int. Cl.
*H04L 12/26* (2006.01)

(52) U.S. Cl.
CPC .................................. *H04L 43/10* (2013.01)

(58) Field of Classification Search
CPC .......... G06F 11/00; G06F 21/33; G06F 21/57; G06F 21/10; G06F 21/73; G06F 21/552; G06F 2221/0704; G06F 2221/034; G06F 12/1408; G06F 9/455; G06F 9/45558; G06F 21/121; G06F 21/123; G06F 21/604; H04L 63/0876; H04L 43/10; G06K 9/00577
See application file for complete search history.

(56) References Cited

U.S. PATENT DOCUMENTS

| | | | | |
|---|---|---|---|---|
| 5,535,338 A * | 7/1996 | Krause | ................ | H04L 12/4625 370/420 |
| 6,148,407 A * | 11/2000 | Aucsmith | ................ | G06F 21/57 726/16 |
| 7,290,149 B2 * | 10/2007 | Alabraba | ................ | G06F 21/10 713/189 |
| 7,788,536 B1 * | 8/2010 | Qureshi | ................ | G06N 5/048 714/26 |
| 8,862,730 B1 * | 10/2014 | Hernacki | ............ | H04L 63/1408 709/224 |
| 9,135,444 B2 * | 9/2015 | Carter | ................ | G06F 21/33 |
| 9,146,721 B1 * | 9/2015 | Nagaraja | ................ | G06F 8/60 |
| 9,270,677 B1 * | 2/2016 | Feeser | ................ | G06F 21/57 |
| 2005/0215241 A1 * | 9/2005 | Okada | ................ | H04W 48/04 455/414.1 |
| 2007/0168329 A1 * | 7/2007 | Haft | ................ | G06F 17/30536 |
| 2009/0300348 A1 * | 12/2009 | Aciicmez | ................ | H04L 63/08 713/156 |
| 2012/0179907 A1 * | 7/2012 | Byrd | ................ | H04L 9/3268 713/156 |

(Continued)

*Primary Examiner* — Vivek Srivastava
*Assistant Examiner* — Todd L Barker
(74) *Attorney, Agent, or Firm* — Klarquist Sparkman, LLP

(57) ABSTRACT

A method of detecting misconfiguration of a hardware resource during a software deployment in a service provider may include receiving configuration data for the hardware resource, the configuration data being associated with a hardware layer, an operating system layer and an application layer of the hardware resource. At least a first fingerprint may be generated using the configuration data associated with the hardware resource. Software may be deployed to the hardware resource. Updated configuration data for the hardware resource may be received, the updated configuration data being associated with the hardware layer, the operating system layer and the application layer of the hardware resource after the deployment. A second fingerprint associated with the hardware resource that is based on the updated configuration data may be generated. The first fingerprint may be compared to the second fingerprint to determine whether the software deployment was successful.

16 Claims, 9 Drawing Sheets

(56) References Cited

U.S. PATENT DOCUMENTS

| | | | |
|---|---|---|---|
| 2012/0210433 A1* | 8/2012 | Kovar | G06F 21/577 |
| | | | 726/25 |
| 2012/0297367 A1* | 11/2012 | Mujeeb | G06F 11/3688 |
| | | | 717/125 |
| 2014/0173060 A1* | 6/2014 | Jubran | G06F 9/5072 |
| | | | 709/220 |
| 2014/0188676 A1* | 7/2014 | Marmolejo-Meillon | H04L 41/0809 |
| | | | 705/34 |
| 2014/0207920 A1* | 7/2014 | Hirana | H04L 41/0813 |
| | | | 709/220 |
| 2014/0258733 A1* | 9/2014 | Scott-Nash | G06F 12/1408 |
| | | | 713/190 |
| 2014/0282502 A1* | 9/2014 | Natu | G06F 9/45533 |
| | | | 718/1 |
| 2015/0169852 A1* | 6/2015 | Lange | G06F 21/121 |
| | | | 726/1 |
| 2015/0339476 A1* | 11/2015 | Davis | G06F 21/552 |
| | | | 726/22 |

\* cited by examiner

DETECTING MISCONFIGURATION DURING SOFTWARE DEPLOYMENT

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

With the increased use of computing resources, reliability of software deployment is essential. For example, deploying new software to a server can result in a misconfiguration or unintended change being introduced with the new software resulting in the server being in some way impaired or degraded. Depending on the size of the server fleet, software deployment which causes misconfiguration in one or more server settings can impact many servers prior to the issue becoming known. It can also be the case that a misconfiguration will go undetected by monitoring that is in place prior to the software deployment.

BRIEF DESCRIPTION OF THE DRAWINGS

Various embodiments in accordance with the present disclosure will be described with reference to the drawings, in which.

DETAILED DESCRIPTION

Figure 1:
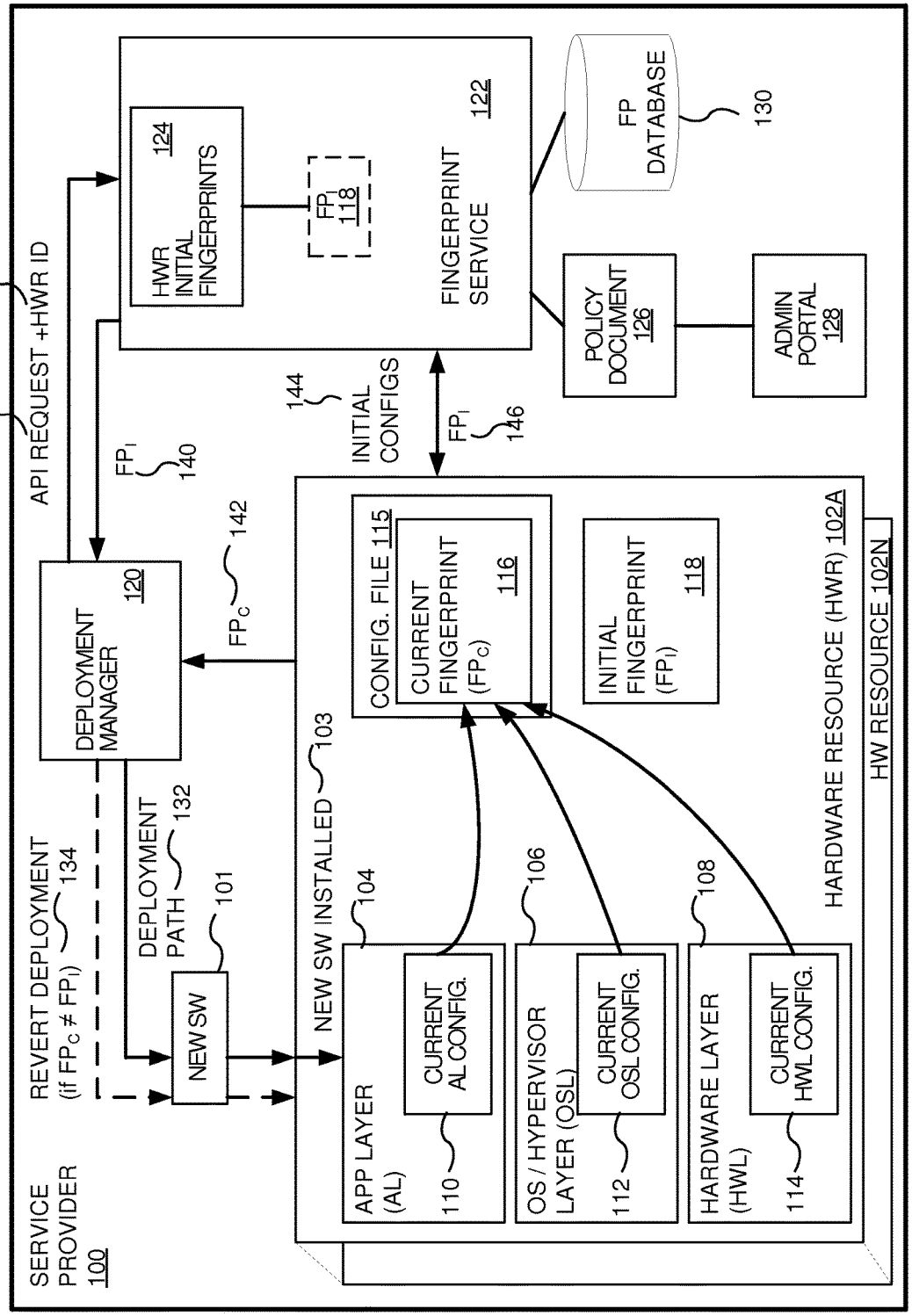
FIG. 1 is a diagram of an example network environment supporting misconfiguration detection during software deployment in a service provider, in accordance with an embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment. As used herein, the terms "virtual machine" and "virtual machine instance" are interchangeable.

As used herein, the term "fingerprint" (or "configuration fingerprint") refers to configuration data associated with the state of an application layer ("APL"), an operating system layer ("OSL"), and/or a hardware layer ("HWL") of a hardware resource. In some instances, the term "fingerprint" (or "configuration fingerprint") may also refer to a numeric representation (e.g., a hash value) that is generated based on the configuration data.

As used herein, the term "application layer" may include an abstraction layer reserved for communication protocols and methods designed for process-to-process communications within a device or between devices across a network. The "application layer" may also provide services for an application program to ensure effective communication with another application program can be achieved (e.g., intra-device or inter-device communications between application programs).

As used herein, the term "application program" (sometimes shortened to application) can refer to any program designed to perform a specific function directly for the user or, in some cases, for another application program. Examples of application programs include word processors; database programs; Web browsers; network administration tools; development tools; drawing, paint, and image editing programs; and communication programs. Application programs use the services of the computer's operating system and other supporting programs.

As used herein, the term "hardware layer" may include networking and computing hardware of a computing or networking device. Put another way, the "hardware layer" defines the means of running an operating system, performing communications between application programs, or providing electrical, mechanical, and/or procedural interface to a communication medium such as a networking or computing device. In some instances, the "hardware layer" may include a collection of physical elements that constitutes a computing system, such as a computing or networking device. Some example physical elements include a central processing unit (CPU), memory, non-transitory storage media, and so forth.

As used herein, the term "operating system layer" may include software or firmware that manages one or more hardware resources (e.g., resources of the hardware layer), as well as provides common services for one or more application programs (e.g., time-sharing or scheduling tasks, input/output management tasks, memory allocation tasks, processor allocation tasks, facilitate communications between application programs and hardware resources, and so forth). In some instances the "operating system layer" may include a hypervisor or a software kernel associated with an operating system.

As used herein, the term "hardware resource" may include a server or another type of computing device operating in a computing environment (e.g., a data processing network environment) and having the ability to have software deployed (or installed) on it. The term "hardware resource" may also include one or more network devices, such as network switches, routers, and/or other types of network devices.

The following description is directed to techniques and solutions supporting detecting misconfiguration during software deployment for a hardware resource. To reduce the possible impact of software deployments that cause misconfiguration, a deployment manager may be used together with a fingerprint service. At the time a hardware resource (e.g., a server) is deployed, a deployment time check of the server configuration and features may be performed, and an initial fingerprint of various configuration data may be generated and stored. The server may include an on-server component that produces and serves the configuration and feature data to the fingerprint service to generate the initial fingerprint, or the initial fingerprint may be generated at the server. Similarly, initial fingerprints may be generated for other hardware resources (e.g., additional servers in a network environment of a service provider), and the fingerprint service may manage (e.g., store in a database) such initial fingerprints. At time software is deployed to a server, a check/collection of the server configurations and features may be performed and a new (e.g., current) fingerprint may be generated based on the configuration data after the software is deployed. The current configuration fingerprint may be compared with the initial configuration fingerprint to determine whether the software deployment is successful (e.g., the fingerprints match or differ by an acceptable, pre-defined margin) or not successful (e.g., both fingerprints do not match or differ by a margin larger than the pre-defined acceptable margin). If the deployment is unsuccessful, the deployment manager may revert it.

Figure 4:
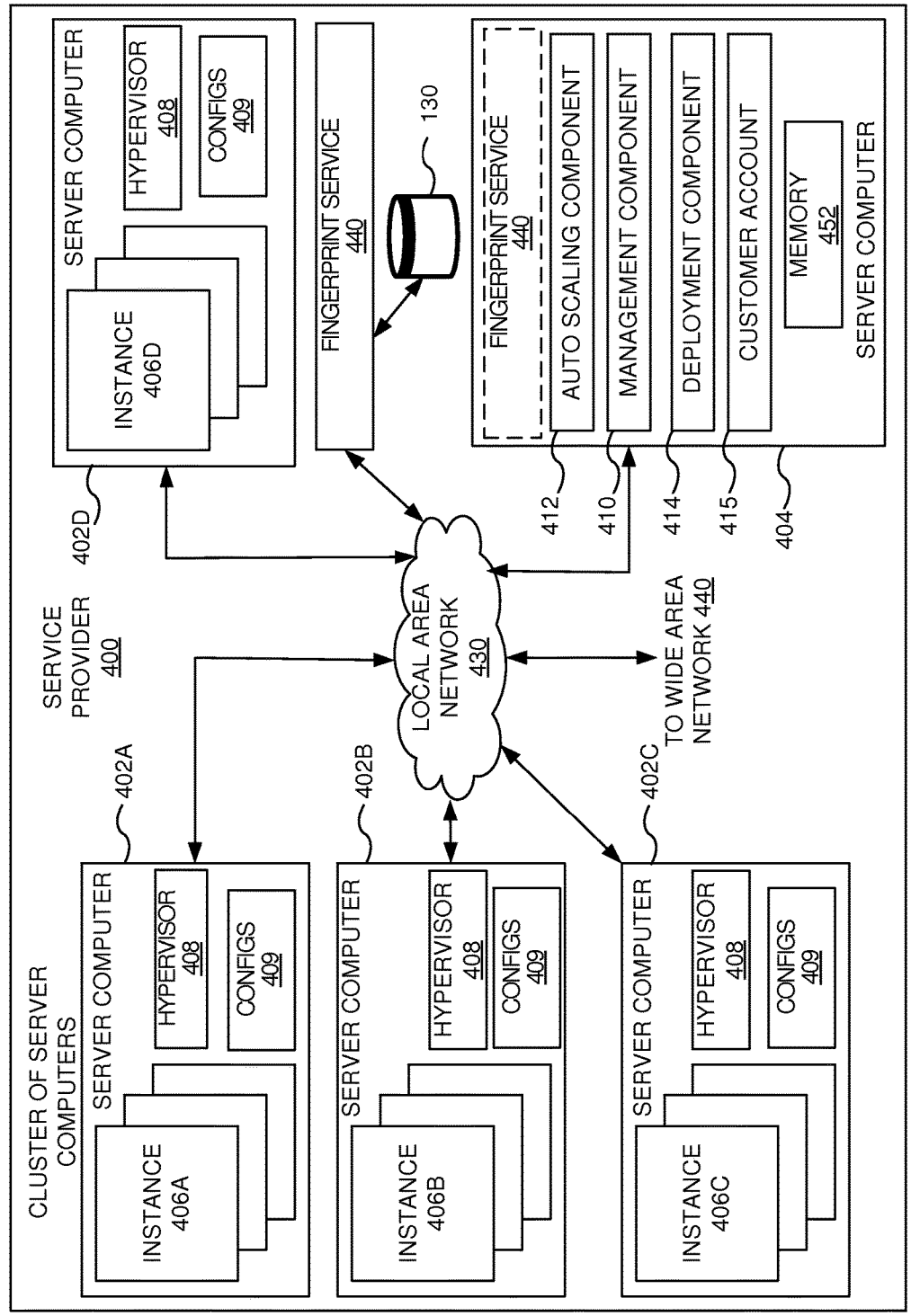
FIG. 4 is an example system diagram showing a plurality of virtual machine instances running in a multi-tenant environment, using a fingerprint service, in accordance with an example embodiment of the disclosure.

FIG. 1 is a diagram of an example network environment supporting misconfiguration detection during software deployment in a service provider, in accordance with an embodiment of the disclosure. Referring to FIG. 1, the service provider 100 (which is discussed in greater detail in reference to FIG. 4 below) may be a multi-tenant cloud network environment where one or more clients may run one or more virtual machine instances (VMIs) (e.g., as illustrated in FIG. 4) on one or more hardware resources (e.g., server computers) 102A, . . . , 102N. The service provider 100 may further comprise a deployment manager 120 and a fingerprint service 122.

The hardware resource ("HWR") 102A (or any other HWR 102A, . . . , 102N) may be a computing device, such as a server computer. The HWR 102A may comprise a hardware layer ("HWL") 108 associated with HWL configuration data (e.g., configuration data for various hardware used by the HWR 102A). The HWR 102A may further comprise an operating system layer (OSL) 106 and an application layer (AL) 104. The OSL 106 may be associated with an operating system (e.g., a hypervisor as illustrated in FIG. 4), and configurations for the OSL 106 may change at, for example, HWR rebuild time (i.e., a new install or re-install of the OS). The AL 104 may be associated with one or more applications running on the HWR 102A, and configurations for the AL 104 may change during operation of the HWR 102A. However, configurations for the AL 104 may change within certain range.

The deployment manager 120 may comprise suitable logic, circuitry, interfaces, and/or code and may be operable to deploy new software to one or more of the HWRs 102A, . . . , 102N, and detect whether the new software deployment results in any misconfiguration of the HWRs. In this regard, the deployment manager 120 may be operable to obtain a current configuration fingerprint FPc 116, which includes configuration data for the AL 104, OSL 106, and/or HWL 108 after new software (e.g., 101) has been deployed. Additionally, the deployment manager 120 may obtain a previous configuration fingerprint (i.e., a configuration fingerprint that has been obtained at the time of deployment of the HWR (e.g., initial configuration fingerprint FPi 118) and, as such, can be considered a configuration fingerprint that is based on valid configuration data. The deployment manager 120 may then determine whether the new software deployment is acceptable based on a comparison of the current configuration fingerprint FPc 116 and the initial configuration fingerprint FPi 118 for the HWR 102A.

The fingerprint service 122 may comprise suitable logic, circuitry, interfaces, and/or code and may be operable to generate one or more initial configuration fingerprints 124 for the HWRs 102A, . . . , 102N, store such fingerprints (e.g., in the fingerprint database 130), as well as communicate one or more of the initial fingerprints 124 to the deployment manager 120 in response to API requests from the deployment manager 120. The initial fingerprint FPi 118 may be a representative initial fingerprint for the HWR 102A. The initial fingerprints 124 (including FPi 118 for HWR 102A) may be stored within the fingerprint service 122 and/or in the fingerprint database 130 communicatively coupled to the fingerprint service 122.

Figure 2:
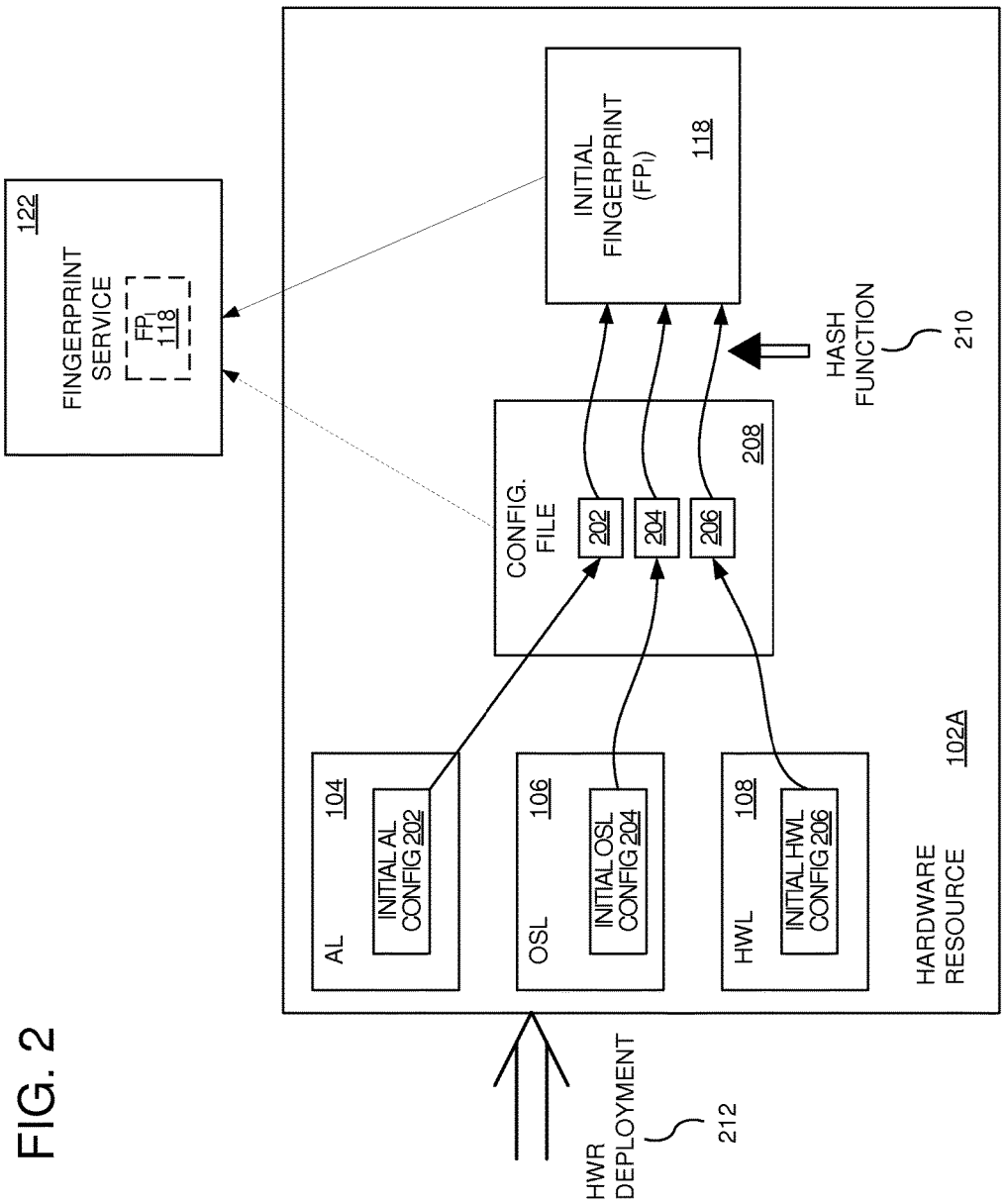
FIG. 2 is a diagram of initial fingerprint generation used for configuration verification, in accordance with an embodiment of the disclosure.

FIG. 2 is a diagram of initial fingerprint generation used for configuration verification, in accordance with an embodiment of the disclosure. Referring to FIGS. 1-2, the HWR 102A may be deployed within the service provider 100 at deployment 212. After HWR 102A has been deployed, initial configuration information may be collected (or otherwise generated) for each of the layers 104, 106, and 108. More specifically, initial AL configuration 202 may be collected for the application layer (AL) 104, initial OSL configuration 204 may be collected for the operating system layer (OSL) 106, and initial HWL configuration 206 may be collected for the hardware layer (HWL) 108.

The initial configuration settings 202-206 may be stored in a configuration file 208. The initial fingerprint FPi 118 may be generated based on the initial configuration settings 202-206. For example, a hash function 210 (or another function or algorithm) may be applied to (portions of or the entire data of) the initial configuration settings 202-206, generating a single numeric value as the FPi 118. In other instances, the FPi 118 may include the initial configuration settings 202-206, as initially collected. The FBi 118 may be stored as a separate record within the configuration file 208 or may be stored by the HWR 102A separately from the configuration file 208 (e.g., in attached storage).

The above processing functionalities relating to the generation of the FPi 118 (or initial fingerprints for any of the other HWRs) may be performed by the HWR 102A, by the fingerprint service 122 and/or the deployment manager 120. For example, the fingerprint service 122 may access the configuration file 208 and may obtain (e.g., as indicated by 146 in FIG. 1) the generated FPi 118 (or access the FPi 118 directly if stored separately from the file 208). The fingerprint service 122 may also obtain the initial configuration settings 202-206 (e.g., as indicated by 144 in FIG. 1) and generate the FPi 118 separately from the HWR 102A. The initial fingerprints 124 (including FPi 118 for HWR 102A) for the HWRs 102A, . . . , 102N may be stored within the fingerprint service 122 or in a dedicated fingerprint database 130 coupled to the fingerprint service 122. Each of the initial fingerprints 124 may also be stored with a HWR identifier that identifies the HWR associated with an initial fingerprint. The HWR identifier (or ID) may be used to locate and retrieve the initial fingerprint for the corresponding HWR, as explained further below.

In accordance with an example embodiment of the disclosure, the fingerprint service 122 may use a policy document 126, which may specify one or more policies in connection with the initial fingerprints 124 and/or the current fingerprints (e.g., FPc 116). For example, the policy document 126 may specify an acceptable variation in any of the configuration settings for the layers 104-108. In some instances, the configuration settings for the hardware layer 108 and the operating system layer 106 may allow for a range of variation (or no variation) from the initial configuration settings (e.g., 206, 204), as well as some acceptable range of variation in the configuration settings of the application layer 104 from the initial configuration settings (e.g., 202). For example, the hypervisor (or operating system) version may be part of the OS layer 106, and the hypervisor version may be allowed to change if a new hypervisor is deployed at the hardware resource. In this regard, the policy document 126 may specify an acceptable range of variation for each of the initial fingerprints 124, based on an acceptable range of deviation in one or more of the initial configurations 202-206. Other policies/rules may be further specified by the policy document 126 in connection with misconfiguration detection functionalities using fingerprints. The policy document 126 may be established/edited by, e.g., an administrator via an administrator portal 128.

Referring to FIGS. 1-2, in an example operation, the deployment manager 120 may deploy new software 101 to HWR 102A via deployment communication path 132. The HWR 102A may install the new software 101 at 103, which may result in one or more configuration changes in the layers 104-108. After the new software 101 is deployed, the HWR 102A may collect/generate current configuration data (or current configuration settings) for the layers 104-108. More specifically, current AL configuration 110 may be collected for the application layer (AL) 104, current OSL configuration 112 may be collected for the operating system layer (OSL) 106, and current HWL configuration 114 may be collected for the hardware layer (HWL) 108.

The current configuration settings 110-114 may be stored in a configuration file 115. The current fingerprint FPc 116 may be generated based on the current configuration settings 110-114. For example, a hash function (or another function or algorithm) may be applied to (portions of or the entire data of) the current configuration settings 110-114, generating a single numeric value as the FPc 116. The FBc 116 may be stored as a separate record within the configuration file 115 (as illustrated in FIG. 1) or may be stored by the HWR 102A separately from the configuration file 115 (e.g., in attached storage).

After the FPc 116 is generated, it may be communicated (at 142) to the deployment manager 120. Such communication may be automatically initiated by the HWR 102A upon deployment of the software 101 and generating the current configuration data 110-114 and the FPc 116. In the alternative, the communication of FPC 116 may be in response to an API request received by HWR 102A from the deployment manager 120. The deployment manager 120 may also access HWR 102A and obtain the FPc 116 directly from the HWR 102A.

The deployment manager 120 may communicate an API request 136 to the fingerprint service 122, requesting an initial fingerprint for HWR 102A. In this regard, the API request 136 may also include an HWR identification (or ID) 138, which identifies HWR 102A. The fingerprint service 122 may use the HWR ID 138 to access the HWR initial fingerprints 124 and obtain the FPi 118 associated with the HWR 102A. The FPi 118 may be communicated back to the deployment manager 120 at 140. The fingerprint service 122 may also communicate one or more policies from the policy document 126, specifying, for example, an acceptable variation in the FPi 118.

After the deployment manager 120 obtains the FPi 118 (as well as any policy associated with it) and the FPc 116, the deployment manager 120 may compare the two fingerprints to determine whether the deployment of the new software 101 has caused any misconfiguration. For example, if FPc 116 does not match FPi 118 (or FPc 116 is not within an acceptable range of deviation from the FPi 118), the deployment manager 120 may revert the installation of software 101 at 134. If the two fingerprints match (or are within an acceptable range of deviation established by a policy document), then the software deployment may remain active.

Figure 3:
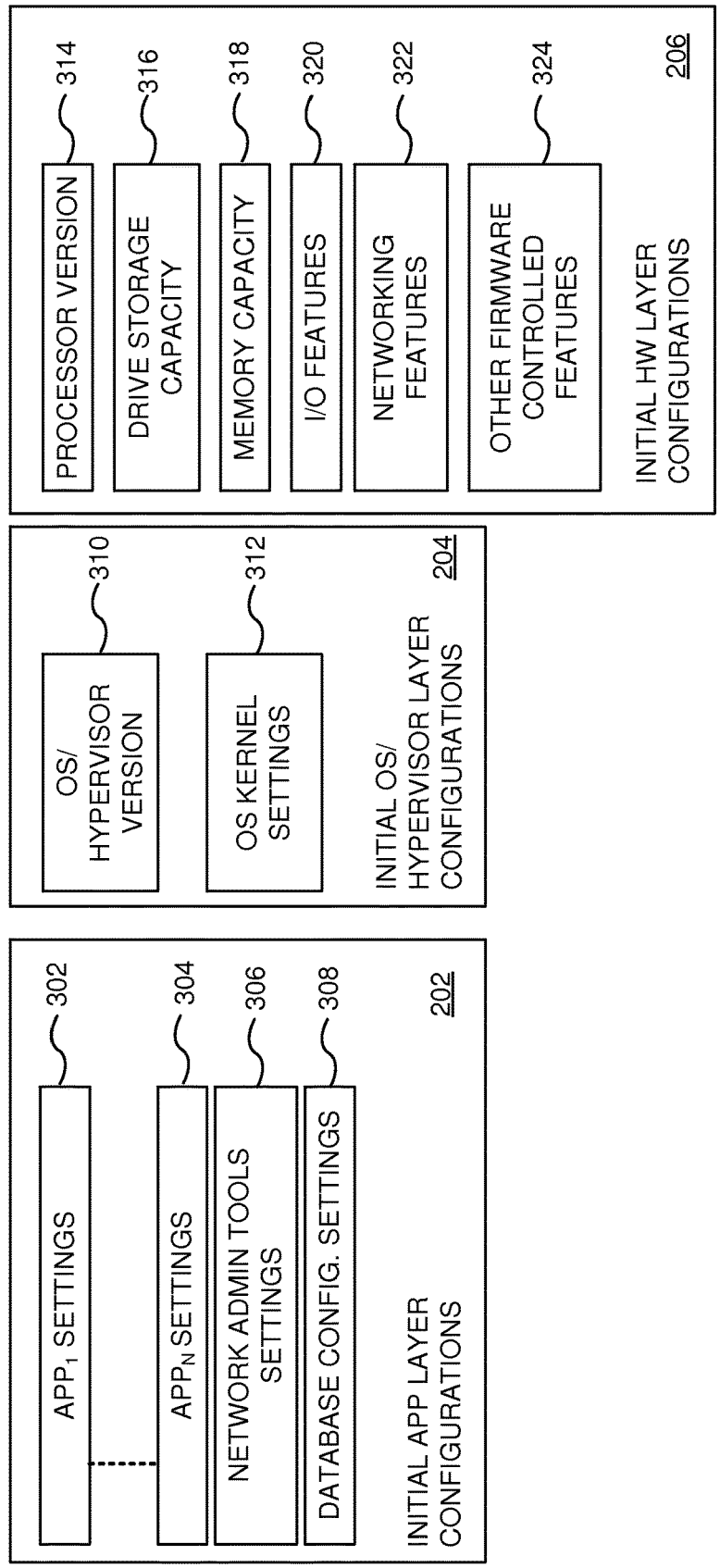
FIG. 3 is a diagram of various configuration parameters and data used for fingerprint generation and configuration verification, in accordance with an embodiment of the disclosure.

FIG. 3 is a diagram of various configuration parameters and data used for fingerprint generation and configuration verification, in accordance with an embodiment of the disclosure. Referring to FIG. 3, the initial application layer configurations 202 may include application settings 302, . . . , 304 for applications APP1, . . . APPn running on the HWR 102A. The AL configurations 202 may further include settings 306 associated with one or more administration tools (e.g., administration software running on HWR 102A), as well as configuration settings 308 associated with one or more databases managed by the HWR 102A.

The initial operating system layer configurations 204 may comprise an operating system (i.e., hypervisor) version 310 as well as any other operating system kernel settings 312.

The initial hardware layer configurations 206 may include processor version 314, drive storage capacity 316, memory capacity 318, configurations related to I/O features 320, configurations related to networking features 322, as well as configurations associated with other firmware controlled features 324.

FIG. 4 is an example system diagram showing a plurality of virtual machine instances running in a multi-tenant environment, using a fingerprint service, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of computing and storage capacity as a service to a community of end recipients (e.g., tenants or customers). The service provider 400 may be the same as the service provider 100 illustrated in FIGS. 1-3.

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise configurations (or configuration settings) 409. For example, the configurations 409 may include one or more initial configuration settings (e.g., 202-206) and/or one or more current configuration settings obtained after deployment of software (e.g., 110-114), as discussed above in reference to FIGS. 1-3.

Figure 5:
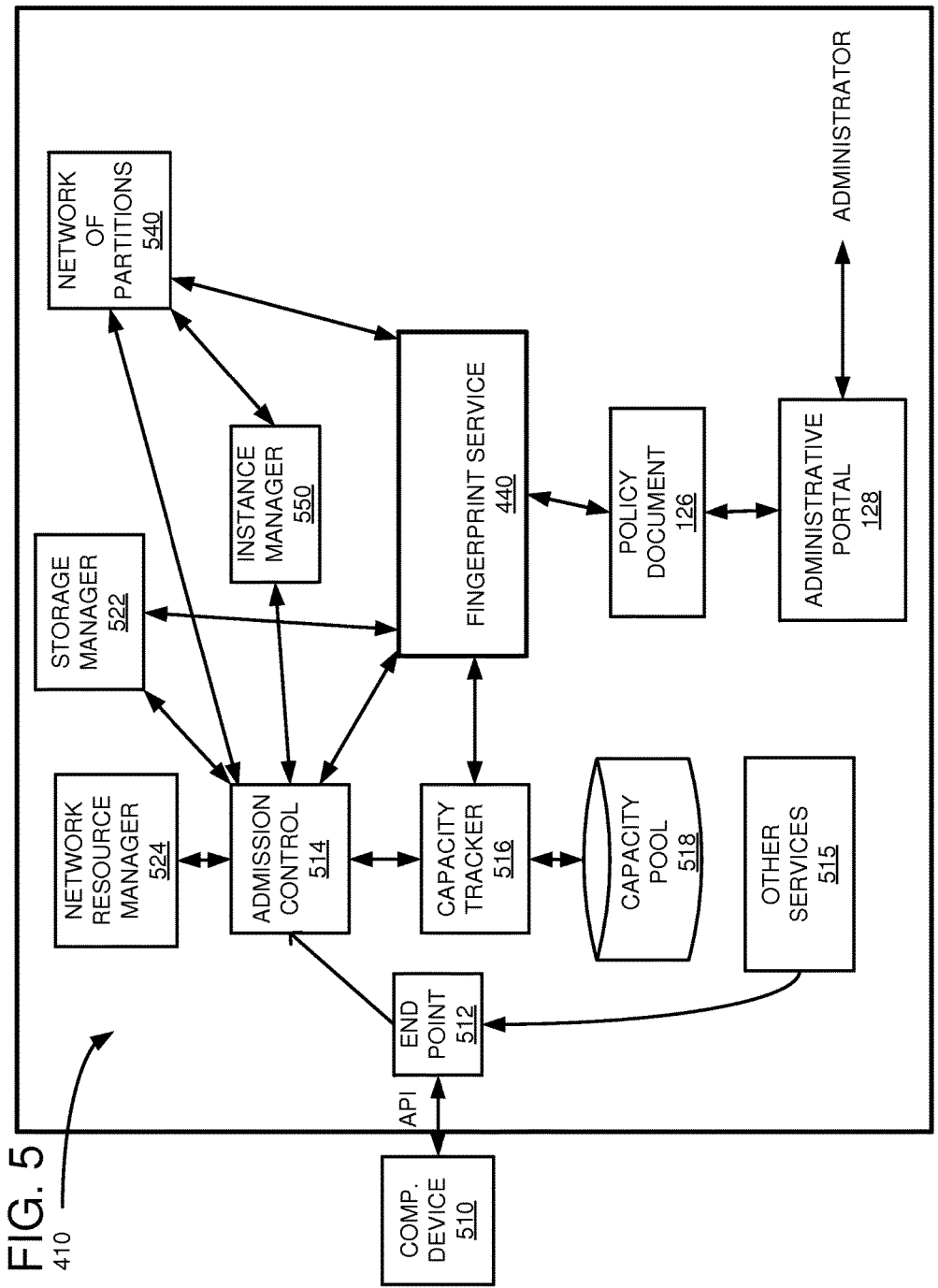
FIG. 5 shows further details of an example system including a plurality of management components associated with a control plane, which may be used to provide a fingerprint service according to one embodiment.

The service provider 400 may also comprise a fingerprint service 440, which may have the functionalities described herein in connection with the fingerprint service 122. The fingerprint service 440 may be implemented as a stand-alone service within the provider 400, as a dedicated server (similar to the servers 402A-402D), and/or may be implemented as part of the server computer 404 that performs management functions. For example, the fingerprint service 440 may be implemented as part of the management component 410 (as seen in FIG. 5). Additionally, the fingerprint service 440 may use the fingerprint database 130 (as described above in reference to FIG. 1) to implement the misconfiguration detecting functionalities described herein.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the fingerprint service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand.

The server computer 404 may further comprise memory 452, which may be used as processing memory by the fingerprint service 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to provide a fingerprint service according to one embodiment. More specifically, FIG. 5 illustrates in further detail the management component 410, which may implement the fingerprint service 440 within the multi-tenant environment of the service provider 400.

In order to access and utilize instances (such as instances 406 of FIG. 4), a computing device 510 can be used. The device 510 can be any of a variety of computing devices, mobile or otherwise, including a cell phone, smartphone, handheld computer, Personal Digital Assistant (PDA), desktop computer, etc., and can be used by a customer or an administrator of the service provider 400. The device 510 can communicate with the service provider 400 through an end point 512, which can be a DNS address designed to receive and process application programming interface (API) requests. In particular, the end point 512 can be a web server configured to expose an API. Using the API requests, the device 510 can make requests to implement any of the functionality described herein (e.g., detecting misconfigurations during software deployment). Other services 515, which can be internal to the service provider 400, can likewise make API requests to the end point 512. The API requests from the device 510 can pass through the admission control 514 and onto the fingerprint service 440 in order to access misconfiguration detection and fingerprint functionalities disclosed herein.

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The fingerprint service 440 may perform the fingerprint and misconfiguration detection functionalities described herein. In some instances, the fingerprint service 400 may combine functionalities performed by the fingerprint service 122 as well as the deployment manager 120 (e.g., the deployment manager 120 may be implemented together with the fingerprint service 122). The fingerprint service 440 may communicate with the capacity tracker 516 to receive information regarding available partitions and/or host servers that can be used for launching or accessing an instance or a host server. The fingerprint service 440 may also use the policy document 126, as described above in reference to FIG. 1. Additionally, communications with the admission control 514, the storage manager 522, and the network of partitions 540 may be used to launch (or re-launch) an instance or access configuration settings of a server computer in accordance with fingerprint generation/management and misconfiguration detection functionalities described herein.

Figure 6:
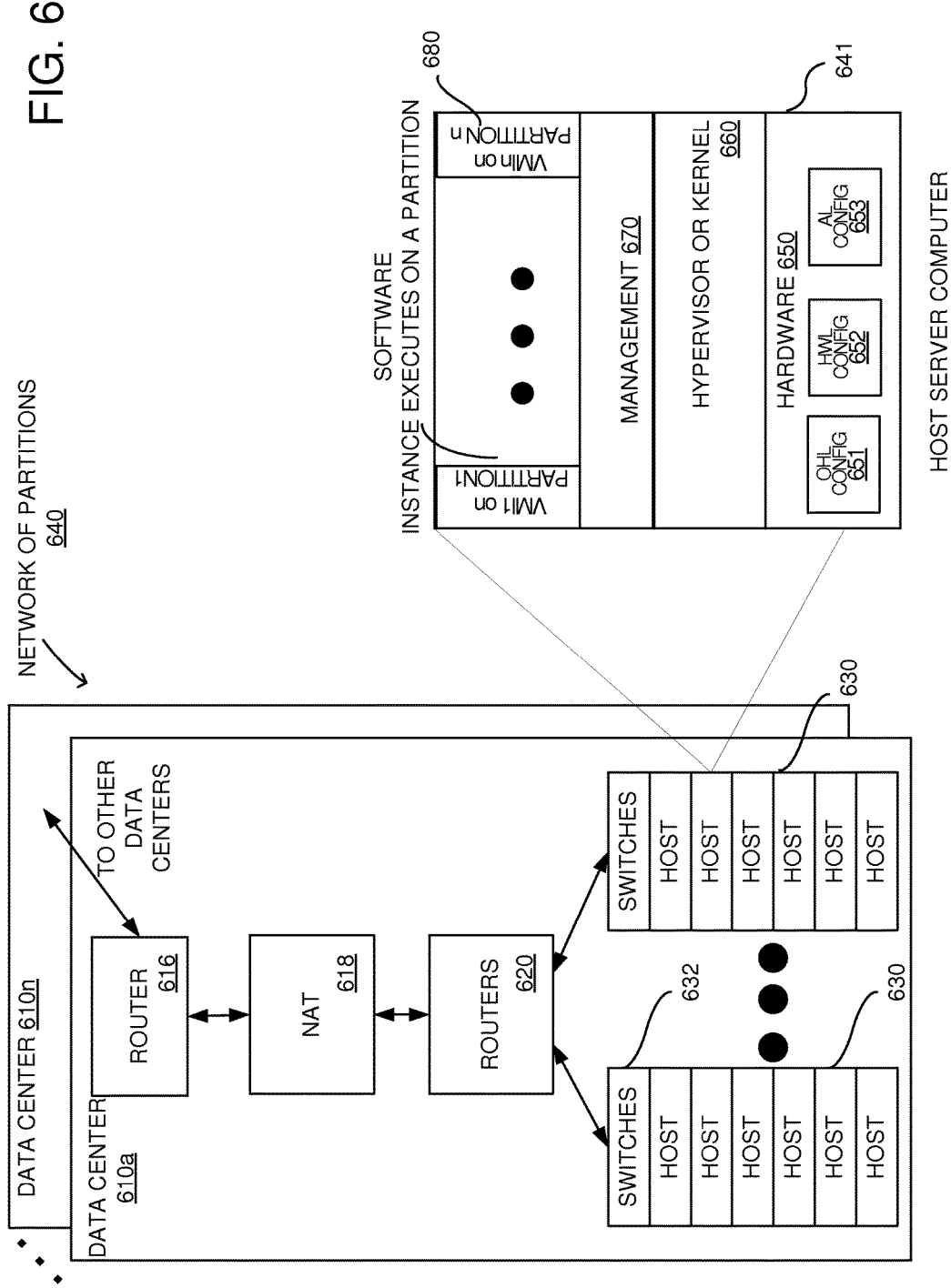
FIG. 6 shows an example of a plurality of host computers, routers, and switches—which are hardware assets used for running virtual machine instances—with the host computers having fingerprint service-related functionalities that may be configured according to one embodiment.

FIG. 6 shows an example of a plurality of host computers, routers, and switches—which are hardware assets used for running virtual machine instances—with the host computers having fingerprint service-related functionalities that may be configured according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers.

Each host 641 has underlying hardware 650. The hardware layer 650 may further store (e.g., in a configuration file such as 115 or 208) configuration settings 651-653 associated with the OHL 106, the HWL 108, and the AL 104, respectively. The configuration data/settings 651-653 may be used for performing misconfiguration detection functionalities using fingerprints, as disclosed herein.

Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used. In an example embodiment, the hypervisor layer 660 may include the DFS software 409, which may be used to install DSNs or DMNs, as described herein.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions.

Figure 7:
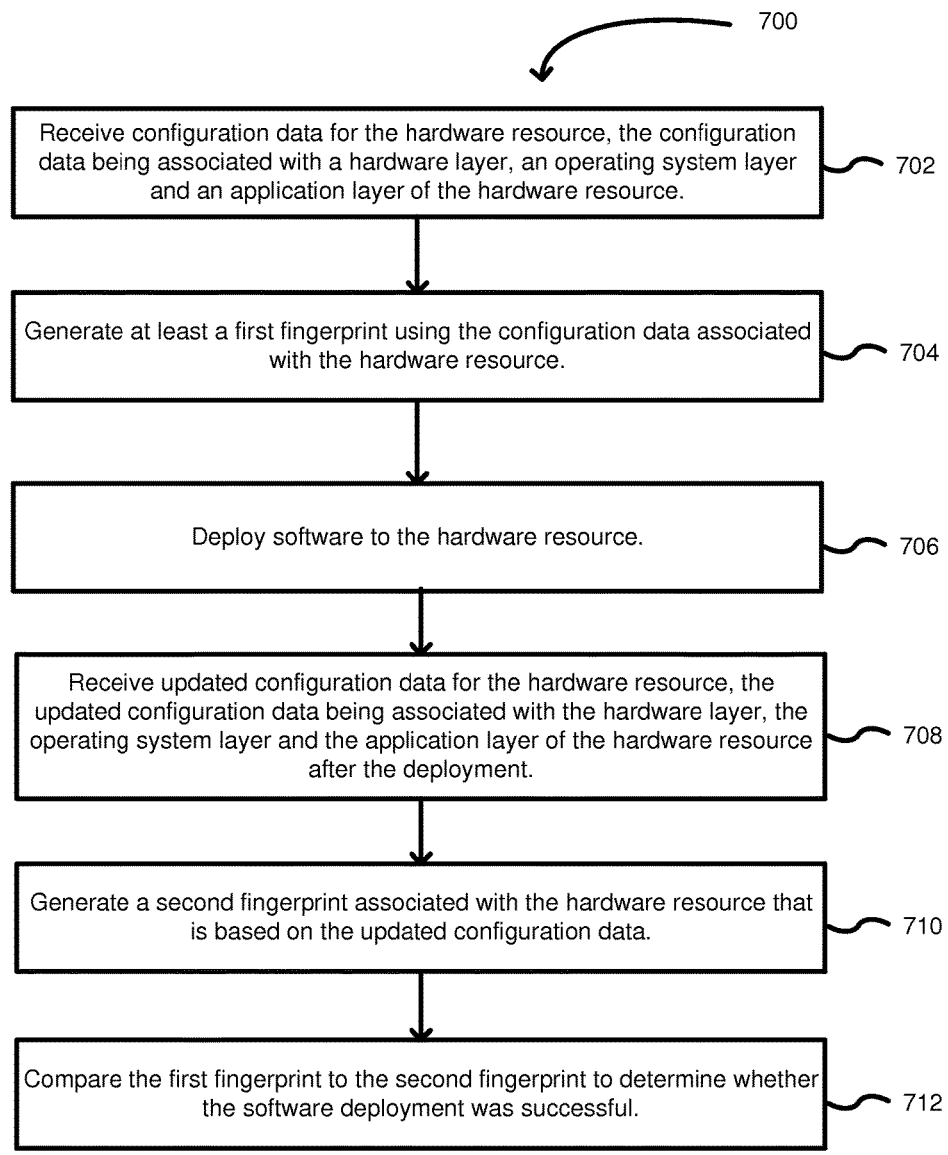
FIGS. 7-8 are flowcharts of example methods of checking configurations of a hardware resource during a software deployment in a service provider, in accordance with an embodiment of the disclosure.
Figure 8:
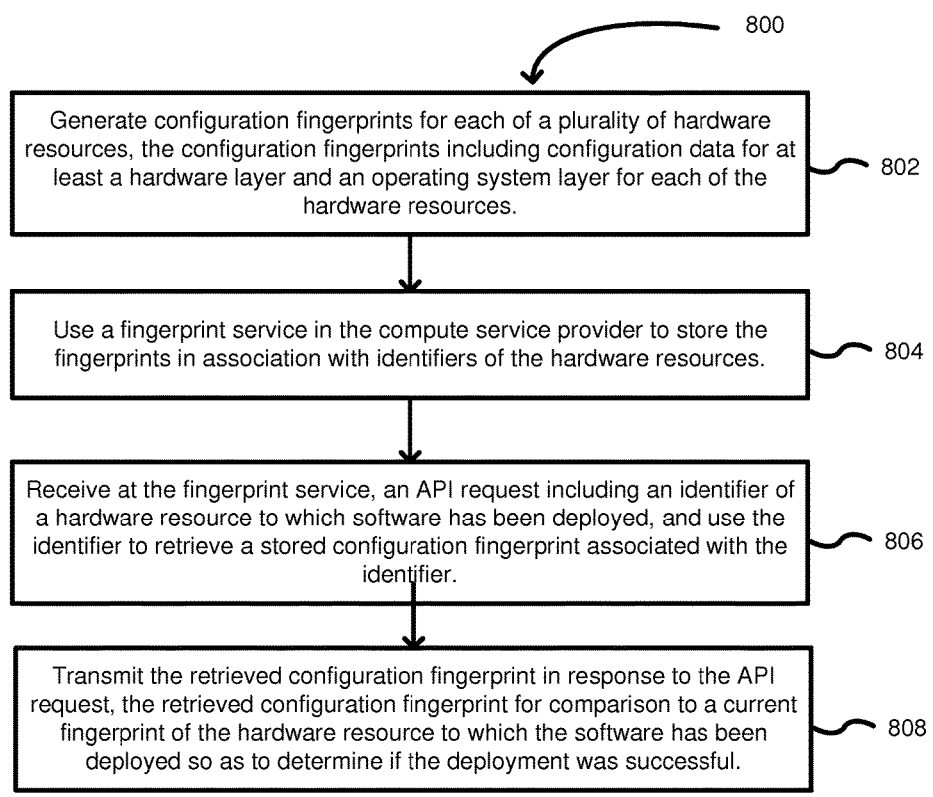

FIGS. 7-8 are flowcharts of example methods of checking configurations of a hardware resource during a software deployment in a service provider, in accordance with an embodiment of the disclosure. Referring to FIGS. 1-3 and 7, the example method 700 may start at 702, when configuration data for a hardware resource (HWR 102A) may be received (e.g., the fingerprint service 122 may receive configuration data 202-206 for purposes of generating FPi 118). The configuration data (202-206) may be associated with a hardware layer (e.g., initial configuration data 206 for HWL 108), an operating system layer (e.g., initial configuration data 204 for OSL 106), and an application layer (e.g., initial configuration data 202 for AL 104) of the hardware resource (HWR 102A).

At 704, at least a first fingerprint (e.g., FPi 118) may be generated using the configuration data (202-206) associated with the hardware resource (102A). The generation of FPi 118 may be performed by the HWR 102A or by the fingerprint service 122. At 706, the deployment manager 120 may deploy software (e.g., 101) to the hardware resource (102A). At 708, updated configuration data (e.g., 110-114) may be received (e.g., 110-114 may be generated within 102A, or current configuration data 110-114 may be generated within HWR 102A and then communicated to the deployment manager 120 or the fingerprint service 122 for generating the FPc 116). The updated configuration data (110-114) may be associated with the hardware layer (e.g., current HWL configuration data 114), the operating system layer (e.g., current OSL configuration data 112), and the application layer (e.g., current AL configuration data 110) of the hardware resource (102A) after the deployment of software 101.

At 710, a second fingerprint (e.g., FPc 116) may be generated, with the second fingerprint being associated with the hardware resource that is based on the updated configuration data (e.g., FPc 116 is based on the current configuration data 110-114 after the software 101 is deployed at HWR 102A). At 712, the deployment manager 120 may compare the first fingerprint (FPi 118) to the second fingerprint (FPc 116) to determine whether the software deployment was successful. For example, after the deployment manager 120 obtains the FPi 118 (as well as any policy associated with it) and the FPc 116, the deployment manager 120 may compare the two fingerprints to determine whether the deployment of the new software 101 has caused any misconfiguration. For example, if FPc 116 does not match FPi 118 (or FPc 116 is not within an acceptable range of deviation from the FPi 118), the deployment manager 120 may revert the installation of software 101 at 134. If the two fingerprints match (or are within an acceptable range of deviation established by a policy document), then the software deployment may remain active.

Referring to FIGS. 1-3 and 8, the example method 800 may start at 802, when configuration fingerprints may be generated for each of a plurality of hardware resources (e.g. initial fingerprints 124 may be generated for HWRs 102A, . . . , 102N). The configuration fingerprints may include configuration data for at least a hardware layer and an operating system layer for each of the hardware resources (e.g., FPi 118 for HWR 102A may be based on initial configuration data 202-206 for layers 104-108, respectively). Similar calculations may be performed with regard to FPi values for the remaining HWRs.

At 804, the fingerprint service 122 in the compute service provider 100 may be used to store the fingerprints (e.g., 124 may be stored in database 130) in association with identifiers of the hardware resources. At 806, the fingerprint service 122 may receive an API request (e.g., 136) including an identifier (e.g., 138) of a hardware resource (102A) to which software (e.g., 101) has been deployed. The fingerprint service 122 may use the identifier (138) to retrieve a stored configuration fingerprint (e.g., FPi 118) associated with the identifier (138) and the HWR (102A). At 808, the fingerprint service 122 may transmit the retrieved configuration fingerprint in response to the API request (136). The retrieved configuration fingerprint (FPi 118) may be used by the deployment manager 120 for comparison to a current fingerprint (e.g., FPc 116) of the hardware resource (102A) to which the software has been deployed so as to determine if the deployment was successful.

In accordance with an example embodiment of the disclosure, a system for checking configurations of a hardware resource during a software deployment in a compute service provider may include a plurality of host server computers (e.g., 102A-102N or 402) coupled together through a network (430, 440) to form the service provider (100, 400). At least a portion of the host server computers may be used for executing a plurality of virtual machine instances (406) associated with a customer account. The system may also include a service (e.g., fingerprint service 122) within the compute service provider and coupled to the host server computers. The service (122) may be operable to receive configuration data (e.g., FPi 118 and 124) for at least one of the host server computers (102A). The system may also include a deployment manager (120) coupled to the service (122) and the host server computers. The deployment manager (120) may be operable to deploy software (101) to at least one of the host server computers (102A); receive the configuration data (FPi 118) from the service (122); receive updated configuration data for the at least one of the host server computers after the deployment (e.g., current FPc 116); and determine whether the software deployment was successful based on a comparison of the configuration data with the updated configuration data (e.g., based on a comparison between FPc 116 and FPi 118).

Figure 9:
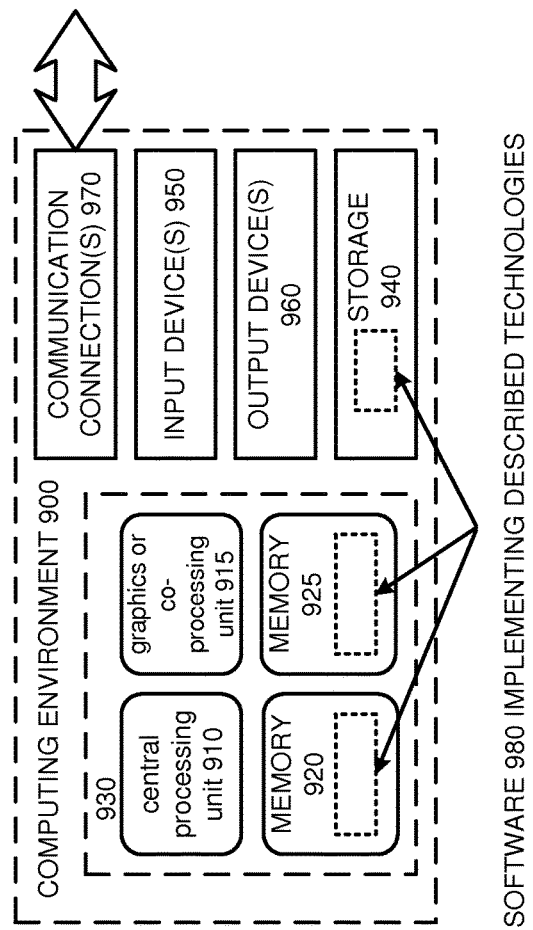
FIG. 9 depicts a generalized example of a suitable computing environment in which the described innovations may be implemented.

FIG. 9 depicts a generalized example of a suitable computing environment in which the described innovations may be implemented. Referring to FIG. 9, the computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations (e.g., functionalities) described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method of managing a hardware resource during a software deployment in a service provider, comprising:
   prior to the software deployment on the hardware resource:
   receiving, at a server computer in the service provider, configuration data for the hardware resource, the configuration data being associated with each of a hardware layer, an operating system layer, and an application layer of the hardware resource, wherein the configuration data is generated at deployment of the hardware resource in the service provider; and
   generating, based on a policy document, at least a first fingerprint using the configuration data associated with the hardware resource, wherein generating the first fingerprint includes transforming the configuration data into a first hash value representing a configuration of each of the hardware layer, the operating system layer and the application layer;
deploying a software resource to the hardware resource;
receiving updated configuration data for the hardware resource, the updated configuration data being associated with each of the hardware layer, the operating system layer and the application layer of the hardware resource after the deployment;
generating, based on the policy document, a second fingerprint in response to the software resource deployment associated with the hardware resource based on the updated configuration data, wherein generating the second fingerprint includes transforming the updated configuration data into a second hash value;
comparing the first fingerprint to the second fingerprint to determine whether the software resource deployment was successful by comparing the first hash value to the second hash value relative to a threshold variation value defined in the policy document;
detecting a misconfiguration of the software resource deployment based on the comparison between the first and second fingerprints in accordance with the threshold variation; and
reverting the deployed software resource on the hardware resource to a previous version if the first and second fingerprints are not within the threshold variation;
wherein the policy document stores different values for acceptable ranges for each of the hardware layer, the operating system layer, and the application layer upon comparison between the first and second fingerprints.

2. The method according to claim 1, wherein the comparing includes determining if the second fingerprint is within an acceptable difference range from the first fingerprint.

3. The method according to claim 1, further comprising:
calculating a second hash value for each of the hardware layer, the operating system layer and the application layer based on the updated configuration data; and
generating the first fingerprint and the second fingerprint based on the first hash value and the second hash value, respectively.

4. The method according to claim 1, wherein:
the hardware layer comprises one or more of a CPU, non-volatile memory, and disk storage of the hardware resource;
the operating system layer comprises at least one of a hypervisor and a software kernel of the hardware resource; and
the application layer comprises one or more of a browser, a word processing application, or network administration tools application of the hardware resource.

5. A non-transitory computer-readable medium having instructions thereon for executing a method for monitoring a hardware resource during a software resource deployment in a compute service provider, the method comprising:
prior to the deployment of the software resource:
generating, based on a policy stored on at least one of a server computer in the compute service provider, configuration fingerprints for each of a plurality of hardware resources, the configuration fingerprints including configuration data for at least each of a hardware layer and an operating system layer for each of the hardware resources, wherein the configuration data is obtained at a time of deployment of the plurality of hardware resources, and wherein generating the configuration fingerprints includes transforming the configuration data for at least the hardware layer and the operating system layer into at least a first fingerprint, which is a first numerical value; and
using a fingerprint service running on at least a second server computer in the compute service provider, storing the fingerprints in hardware storage in association with identifiers of the hardware resources;
receiving at the fingerprint service, an API request including an identifier of a hardware resource to which the software resource has been deployed, and using the identifier to retrieve a stored configuration fingerprint associated with the identifier; and
transmitting the retrieved configuration fingerprint in response to the API request, the retrieved configuration fingerprint being purposed for comparison to a current fingerprint of the hardware resource to which the software resource has been deployed, the current fingerprint having being recorded in response to the software resource deployment, so as to determine if the deployment was successful, the current fingerprint being a second numerical value, which is compared to the first numerical value;
detecting a misconfiguration of the hardware resource caused by the software resource deployment based on the comparison between the first and second fingerprints and a threshold variation between the first and second numerical values defined by the policy; and
reverting the deployed software resource on the computing resource to a previous version if a difference between the first and second numerical values exceeds the threshold variation;
wherein the policy reflects different values of acceptable variations for each of the hardware layer, the operating system layer, and an application layer upon comparison between the first and second numerical values.

6. The computer-readable storage of claim 5, further including:
receiving using the fingerprint service, the configuration data from each of the hardware resources.

7. The computer-readable storage of claim 5, further including:
accessing, using the fingerprint service, a configuration file stored at each of the hardware resources, the configuration file storing the configuration data for a corresponding one of the hardware resources.

8. The computer-readable storage of claim 7, further including:
acquiring the configuration data from the configuration file stored at each of the hardware resources.

9. The computer-readable storage of claim 5, further including:
calculating using the fingerprint service, at least one hash value for each of the plurality of hardware resources based on the configuration data for at least the hardware layer and the operating system layer for each of the hardware resources.

10. The computer-readable storage of claim 9, further including:
generating using the fingerprint service, the configuration fingerprints for each of the plurality of hardware resources based on the calculated at least one hash value.

11. The computer-readable storage of claim 5, wherein the configuration fingerprints for each of the plurality of hardware resources further include configuration data for an application layer for each of the hardware resources.

12. The computer-readable storage of claim 9, wherein for a corresponding one of the hardware resources:
- the configuration data for the operating system layer comprises a hypervisor version of a hypervisor running on the hardware resource; and
- the configuration data for the hardware layer comprises at least one of drive storage capacity, memory capacity, or processor version for the hardware resource.

13. A system for monitoring a hardware resource during a software resource deployment in a compute service provider, the system comprising:
- a plurality of host server computers coupled together through a network to form the service provider, at least a portion of the host server computers executing a plurality of virtual machine instances associated with a customer account;
- a service within the compute service provider coupled to the host server computers, the service operable to receive configuration data for at least one of the host server computers, wherein the configuration data is initially collected prior to deployment of the software resource on the hardware resource from the at least one of the host server computers, the configuration data comprising a combination of configuration information including at least settings associated with a hardware layer and a software layer of the hardware resource, and wherein the configuration data is transformed into a first numeric value;
- a deployment manager coupled to the service and the host server computers, the deployment manager operable to:
  - deploy the software resource to at least one of the host server computers;
  - receive updated configuration data in response to the software resource deployment for the at least one of the host server computer, wherein the updated configuration data is transformed into a second numeric value;
  - determine whether the software resource deployment was successful based on a comparison of the configuration data with the updated configuration data by comparing the first numeric value to the second numeric value, and comparing the difference between the first and second numeric values with a threshold variation value provided in a policy document; and
  - automatically reverting the deployed software resource on the hardware resource to a previous version if the difference between the first and second numeric values exceeds the threshold variation value
  wherein the configuration data is associated with at least two of a hardware layer, an operating system layer and an application layer for the at least one of the host server computers and wherein the policy reflects different values of acceptable ranges for the hardware layer, the operating system layer, and the application layer.

14. The system according to claim 13, wherein the updated configuration data is associated with at least two of the hardware layer, the operating system layer and the application layer for the at least one of the host server computers after the software deployment.

15. The system according to claim 13, wherein the service is operable to:
- receive from the deployment manager, an API request including an identifier of the at least one of the host server computers;
- retrieve using the identifier, the configuration data from storage; and
- transmit the retrieved configuration data to the deployment manager in response to the API request.

16. The system according to claim 13, wherein the service is operable to:
- store configuration data for each of the plurality of host server computers upon deployment of the host server computers within the compute service provider.

* * * * *